(12) United States Patent
Tikkanen et al.

(10) Patent No.: US 6,499,032 B1
(45) Date of Patent: Dec. 24, 2002

(54) METHOD FOR IMPLEMENTING AN ASSOCIATIVE MEMORY BASED ON A DIGITAL TRIE STRUCTURE

(75) Inventors: Matti Tikkanen, Espoo; Jukka-Pekka Iivonen, Helsinki, both of (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/390,526

(22) Filed: Sep. 3, 1999

Related U.S. Application Data

(63) Continuation of application No. PCT/FI98/00190, filed on Mar. 4, 1998.

(30) Foreign Application Priority Data

Mar. 14, 1997 (FI) .................................................. 971065

(51) Int. Cl.⁷ .............................................. G06F 17/30
(52) U.S. Cl. ....................................... 707/101; 707/100
(58) Field of Search .......................... 707/3, 5, 6, 100, 707/101, 102, 104.1, 200; 341/51, 67

(56) References Cited

U.S. PATENT DOCUMENTS

| | | | | |
|---|---|---|---|---|
| 5,276,868 A | | 1/1994 | Poole | 395/600 |
| 5,319,777 A | | 6/1994 | Perez | 395/600 |
| 5,430,869 A | | 7/1995 | Ishak et al. | 395/600 |
| 5,848,416 A | * | 12/1998 | Tikkanen | 707/101 |
| 6,115,716 A | * | 9/2000 | Tikkanen et al. | 707/100 |

FOREIGN PATENT DOCUMENTS

| | | |
|---|---|---|
| EP | 375 307 | 6/1990 |
| EP | 408 188 | 1/1991 |
| EP | 650 131 | 4/1995 |
| WO | WO 95/34155 | 12/1995 |

OTHER PUBLICATIONS

K–tree container data structures: fast subscripting, slicing, and concatenation of sequences.; Rodney Bates; *Dr. Dobb's Journal*; Sep. 1994; vol. 19, No. 10, p. 26(5).

Fast IP routing with LC–Tries; achieving gbit/see speed in software, (internet/Web/Online Service Information); Stefan Nilsson et al.; *Dr. Dobb's Journal*; Aug. 1998, vol. 23, No. 8, p. 70 (5).

"Fast Search in Main Memory Databases" Analyti, et al. Computer Science Department Michigan State University, 1992.

* cited by examiner

Primary Examiner—Dov Popovici
Assistant Examiner—Apu M Mofiz
(74) Attorney, Agent, or Firm—Altera Law Group, LLC

(57) ABSTRACT

A method for implementing a memory. The memory is implemented as a directory structure comprising a tree-shaped hierarchy having nodes at several different levels, wherein an individual node can be (i) a trie node comprising an array wherein an individual element may contain the address of a lower node in the tree-shaped hierarchy and wherein an individual element may also be empty, the number of elements in the array corresponding to a power of two, or (ii) a bucket containing at least one element so that the type of an individual element in the bucket is selected from a group including a data unit, a pointer to a stored data unit, a pointer to another directory structure and another directory structure. To optimize storage space occupancy and memory efficiency, trie nodes are maintained in the directory structure in such a way that (1) in a trie node, the number of empty elements is smaller than or equal to half the number of elements in said node or alternatively the number of elements pointing to other trie nodes is greater than a fourth of the number of elements in the node, and (2) the number of addresses in the trie node pointing to other trie nodes is smaller than or equal to half the number of elements in the node, wherein when condition (1) is false the node is halved and when condition (2) is false the node is duplicated. This method also relates to a structure in which buckets are not employed.

18 Claims, 7 Drawing Sheets

00=EMPTY
01=NORMAL TRIE NODE
10=COMPRESSED NODE
11=BUCKET

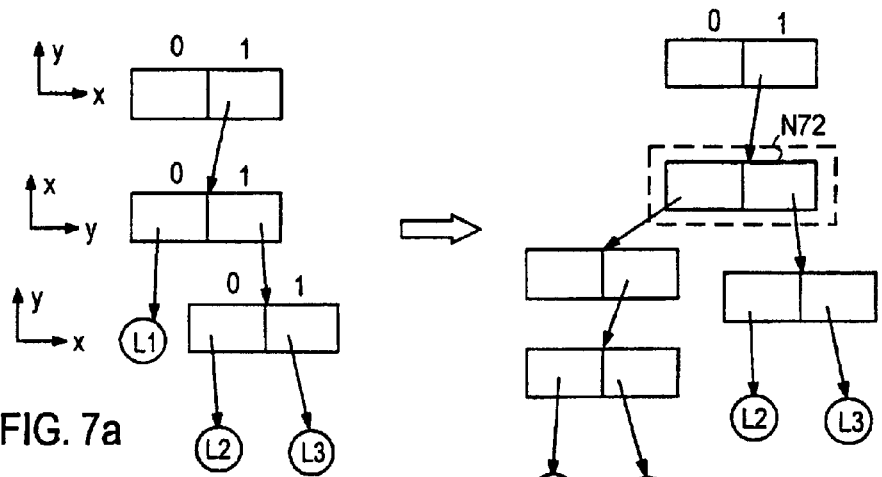
FIG. 7a
FIG. 7b
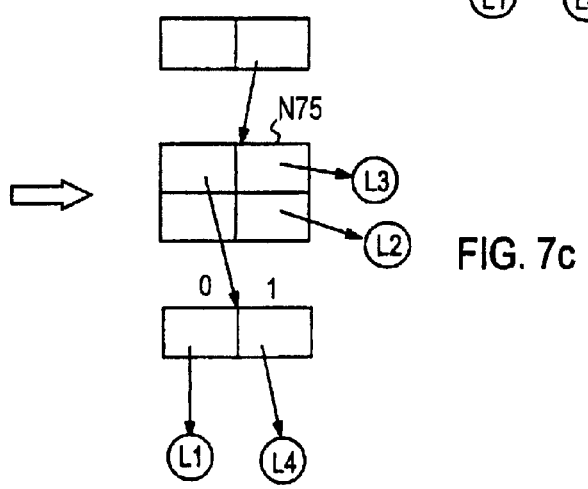
FIG. 7c
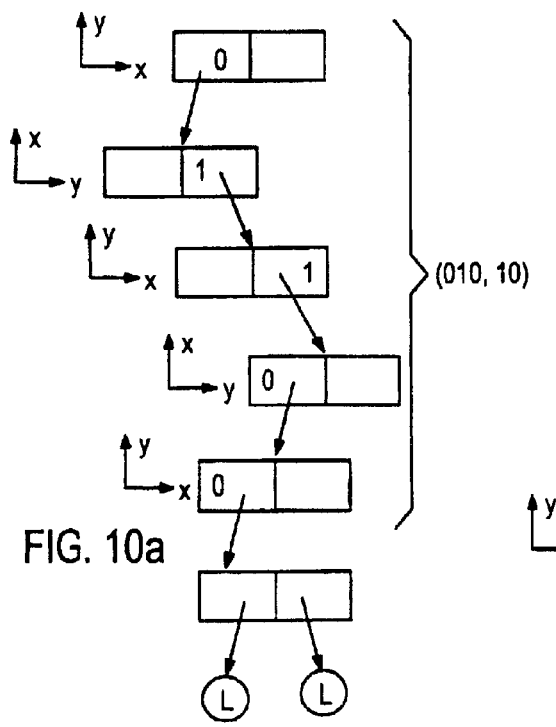
FIG. 10a
FIG. 10b

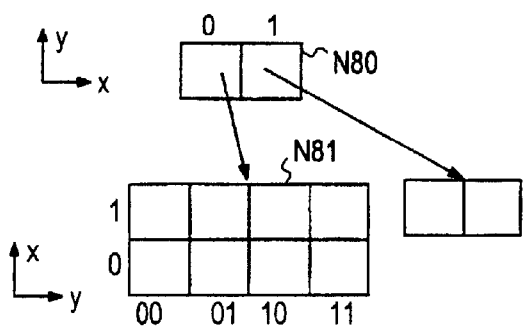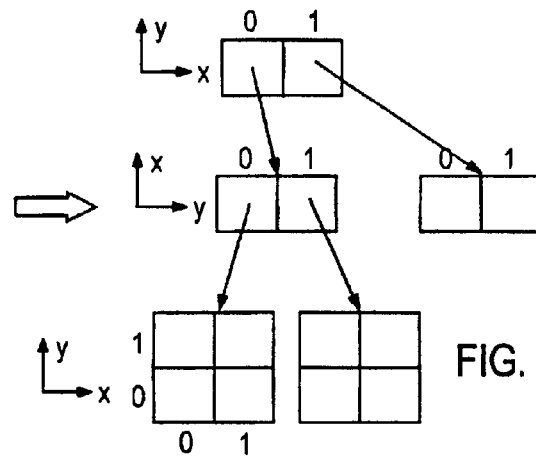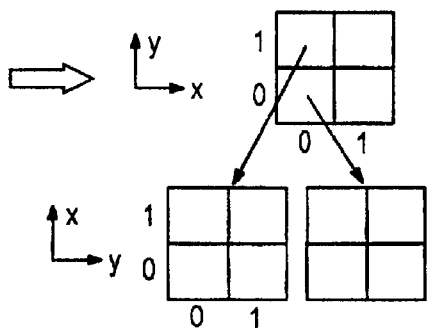
FIG. 8a
FIG. 8b
FIG. 8c
FIG. 9a
FIG. 9b

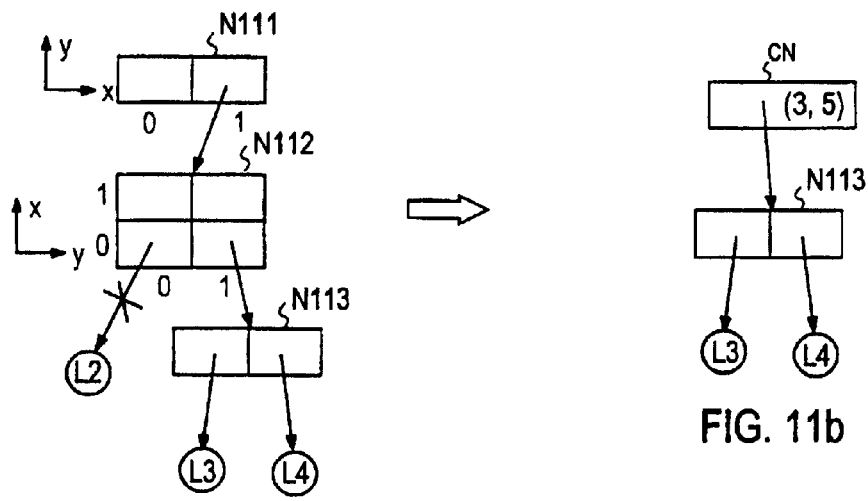
FIG. 11a
FIG. 11b
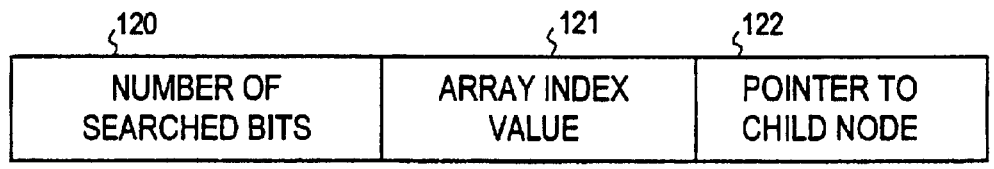
FIG. 12
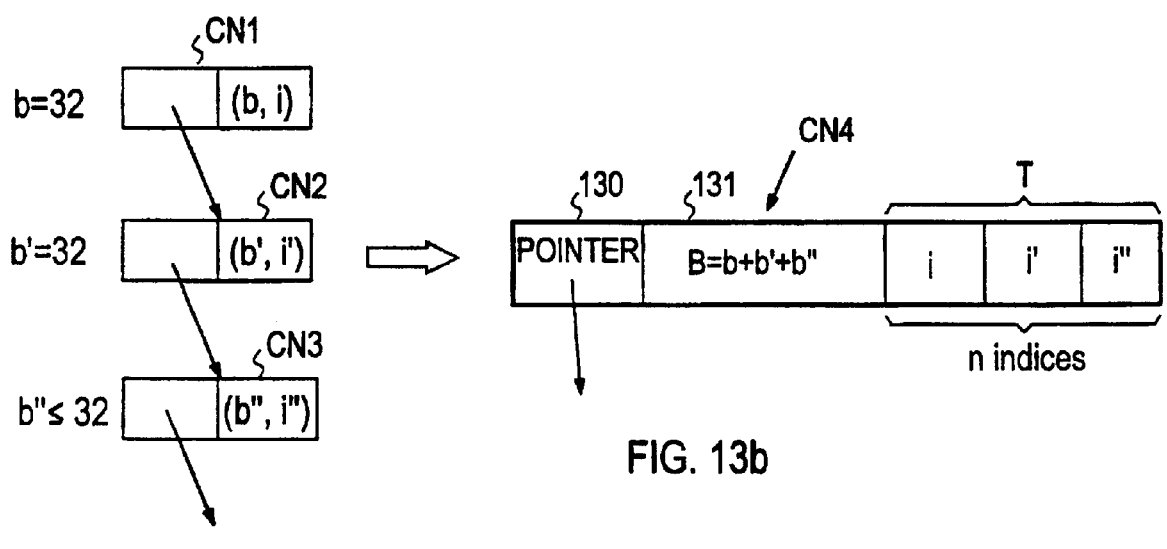
FIG. 13a
FIG. 13b

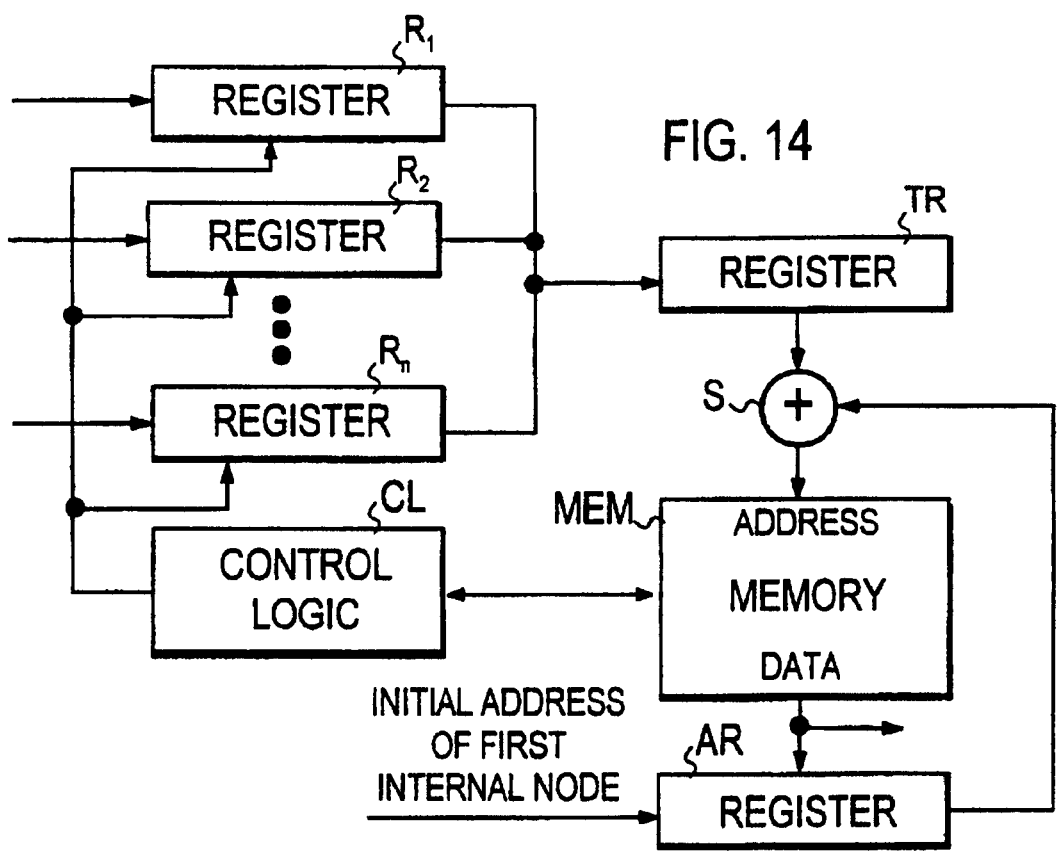

METHOD FOR IMPLEMENTING AN ASSOCIATIVE MEMORY BASED ON A DIGITAL TRIE STRUCTURE

This application is a continuation of PCT/FI98/00190, filed Mar. 4, 1998.

FIELD OF THE INVENTION

The present invention generally relates to implementation of an associative memory, particularly to implementation of an associative memory based on a digital trie structure. The solution in accordance with the invention is intended for use primarily in connection with central memory databases. Suitable applications particularly include databases in which a large number of retrievals are made but in which there are only a small number of insertions or deletions compared to retrievals. Such applications include home location registers (HLR) in mobile communications networks and geographical information systems (GIS) used in map applications.

BACKGROUND OF THE INVENTION

The prior art unidimensional directory structure termed digital trie (the word "trie" is derived from the English word "retrieval") is the underlying basis of the principle of the present invention. Digital tries can be implemented in two types: bucket tries, and tries having no buckets.

A digital bucket trie structure is a tree-shaped structure composed of two types of nodes: buckets and trie nodes. A bucket is a data structure containing a number of data units or a number of pointers to data units or a number of search key/pointer pairs (the number may include only one data unit, one pointer or one key/pointer pair). A trie node, on the other hand, is an array guiding the retrieval, having a size of two by the power of k ($2^k$) elements. If an element in a trie node is in use, it refers either to a trie node at the next level in the directory tree or to a bucket. In other cases, the element is free (empty).

Search in the database proceeds by examining the search key (which in the case of a subscriber database in a mobile telephone network or a telephone exchange, for instance, is typically the binary numeral corresponding to the telephone number of the subscriber) k bits at a time. The bits to be searched are selected in such a way that at the root level of the structure (in the first trie node), k leftmost bits are searched; at the second level of the structure, k bits next to the leftmost bits are searched, etc. The bits to be searched are interpreted as an unsigned binary integer that is employed directly to index the element array contained in the trie node, the index indicating a given element in the array. If the element indicated by the index is free, the search will terminate as unsuccessful. If the element refers to a trie node at the next level, k next bits extracted from the search key are searched at that level in the manner described above. As a result of comparison, the routine branches off in the trie node either to a trie node at the next level or to a bucket. If the element refers to a bucket containing a key, the key stored therein is compared with the search key. The entire search key is thus compared only after the search has encountered a bucket. Where the keys are equal, the search is successful, and the desired data unit is obtained at the storage address indicated by the pointer of the bucket. Where the keys differ, the search terminates as unsuccessful.

A bucketless trie structure has no buckets, but reference to a data unit is effected from a trie node at the lowest level of a tree-shaped hierarchy, called a leaf node. Unlike buckets, the leaf nodes in a bucketless structure cannot contain data units but only pointers to data units. Also a bucket structure has leaf nodes, and hence trie nodes containing at least one pointer to a bucket (bucket structure) or to a data unit (bucketless structure) are leaf nodes. The other nodes in the trie are internal nodes. Trie nodes may thus be either internal nodes or leaf nodes. By means of buckets, the need for reorganizing the directory structure can be postponed, as a large number of pointers/data units can be accommodated in the buckets until a time when the need for reorganization arises.

The solution in accordance with the invention can be applied to a bucket structure as well as a bucketless structure. In the following, bucket structures will nevertheless be used as examples.

FIG. 1 illustrates an example of a digital trie structure in which the key has a length of 4 bits and k=2, and thus each trie node has $2^2=4$ elements, and two bits extracted from the key are searched at each level. Buckets are denoted with references A, B, C, D ... H ... M, N, O and P. Thus a bucket is a node that does not point to a lower level in the tree. Trie nodes are denoted with references IN1 ... IN5 and elements in the trie node with reference NE in FIG. 1.

In the exemplary case of FIG. 1, the search keys for the buckets shown are as follows: A=0000, B=0001, C=0010, ..., H=0111, ... and P=1111. In this case, a pointer is stored in each bucket to that storage location in the database SD at which the actual data, e.g. the telephone number of the pertinent subscriber and other information relating to that subscriber, is to be found. The actual subscriber data may be stored in the database for instance as a sequential file of the type shown in the figure. The search is performed on the basis of the search key of record H, for example, by first extracting from the search key the two leftmost bits (01) and interpreting them, which delivers the second element of node IN1, containing a pointer to node IN3 at the next level. At this level, the two next bits (11) are extracted from the search key, thus yielding the fourth element of that node, pointing to record H.

Instead of a pointer, a bucket may contain (besides a search key) an actual data file (also called by the more generic term data unit). Thus for example the data relating to subscriber A (FIG. 1) may be located in bucket A, the data relating to subscriber B in bucket B, etc. Thus in the first embodiment of an associative memory, a key-pointer pair is stored in the bucket, and in the second embodiment a key and actual data are stored, even though the key is not indispensable.

The search key may also be multidimensional. In other words, it may comprise a number of attributes (for example the family name and one or more forenames of a subscriber). Such a multidimensional trie structure is disclosed in international application No. PCT/FI95/00319 (published under number WO 95/34155). In said structure, address computation is performed in such a way that a given predetermined number of bits at a time is selected from each dimension independently of the other dimensions. Hence, a fixed limit independent of the other dimensions is set for each dimension in any individual node of the trie structure, by predetermining the number of search key bits to be searched in each dimension. With such a structure, the need for memory circuit requirement can be curbed when the distribution of the values of the search keys is known in advance, in which case the structure can be implemented in a static form.

Often, however, the situation is such that the distribution of the search key values is not known in advance. In such a case, the structure disclosed in the above patent application will not give an optimum result in view of storage space occupancy, as the number of bits to be searched in each dimension is a predetermined constant.

If the possibility of reorganizing the structure in accordance with the current key distribution to be optimal in terms of efficiency and storage space occupancy is desired, the size of the nodes must vary dynamically as the key distribution changes. When the key distribution is uniform, the node size may be increased to make the structure flatter. On the other hand, with non-uniform key distributions in connection with which storage space occupancy will present a problem in memory structures employing dynamic node size, the node size can be maintained small, which will enable locally a more uniform key distribution and thereby smaller storage space occupancy.

With dynamic changing of node size, however, a problem will be presented by the fact how the structure of the memory is to be maintained to optimize the memory efficiency (speed) and storage space requirement in accordance with the current key distribution.

SUMMARY OF THE INVENTION

It is an objective of the present invention to provide a solution to the above problem and to provide a method wherewith the required memory space can be maintained as small as possible when the distribution of the search key values is not known in advance, and wherewith the memory operations and memory management can at the same time be maintained as efficient as possible.

This objective is achieved with solutions defined in the independent claims. The first of these discloses a structure employing buckets and the second a structure not employing buckets.

The idea of the invention is first of all to use in address computation the above-stated principle, in accordance with which the number of bits searched in the nodes (node size) is changed dynamically, and thus the tree-shaped structure is changed in accordance with the current key distribution. Additionally, the idea is to incorporate into such a structure maintenance of trie node size (or internal node size in a bucketless case) to be implemented on certain logical conditions, and this is mainly effected by maintaining the fill rates of the trie nodes (internal nodes) and the number of pointers pointing to other trie nodes (internal nodes) at an optimum level. On account of the maintenance, the memory structure of the invention is automatically adapted to the current key distribution so that the above objects are achieved.

The solution in accordance with the invention also ensures effective performance of set operations, as the structure is an order-preserving digital trie.

BRIEF DESCRIPTION OF THE DRAWINGS

In the following the invention and its preferred embodiments will be described in closer detail with reference to examples in accordance with the accompanying drawings, in which FIGS. 9a and 9b illustrate the placing of elements in the duplication of a node, FIGS. 10a and 10b show the principle of forming a compressed node, FIGS. 11a and 11b show an example of the maintenance of the memory structure, FIG. 12 illustrates the structure of a compressed node employed in the memory, FIG. 13a illustrates the limitation posed by the word length employed on combining the nodes, FIG. 13b shows the structure of a collecting node to be formed from the node chain of FIG. 13a, and FIG. 14 shows the memory arrangement in accordance with the invention on block diagram level.

DETAILED DESCRIPTION OF THE INVENTION

Figure 1:
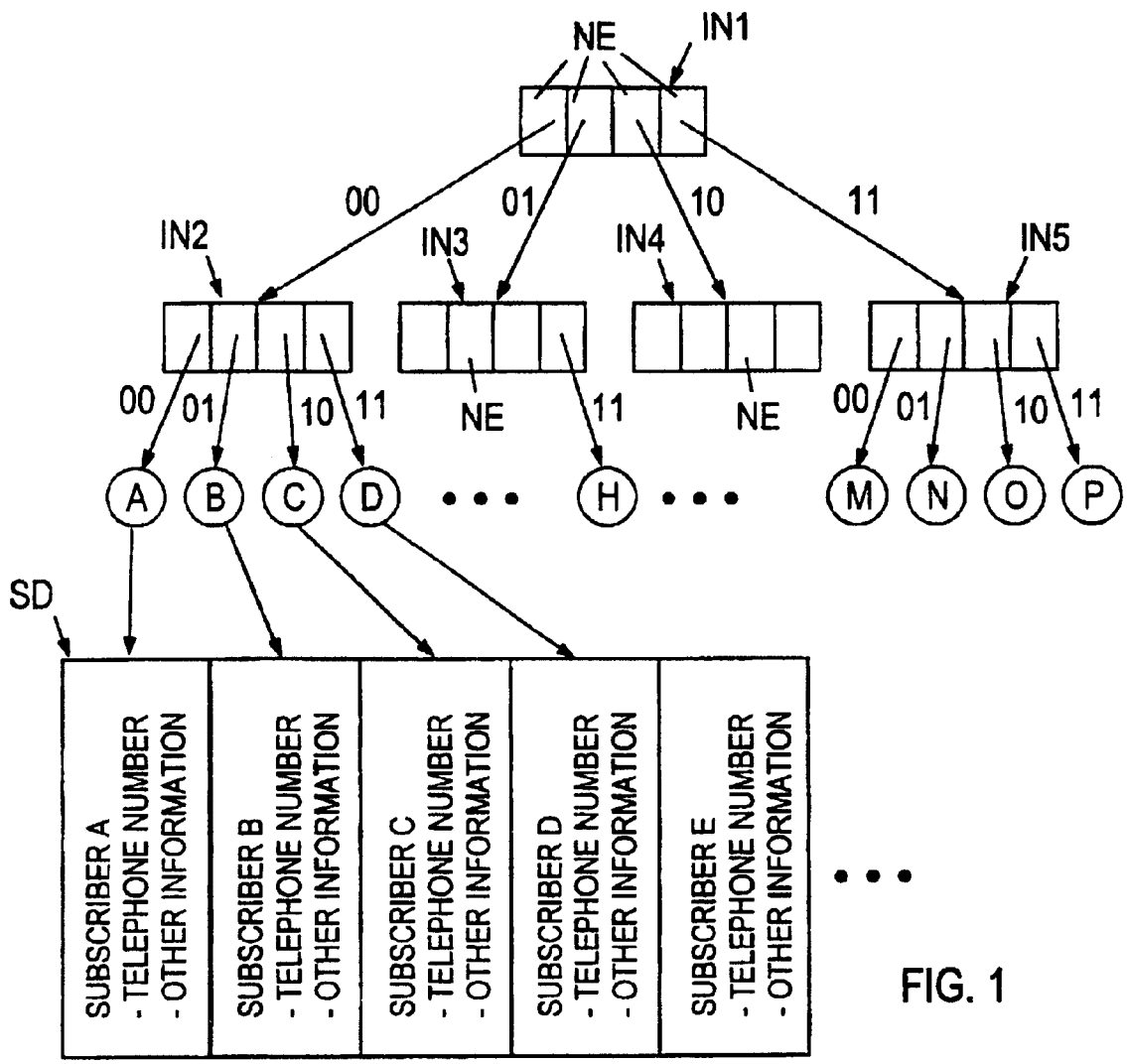
FIG. 1 illustrates the use of a unidimensional digital trie structure in the maintenance of subscriber data in a telephone exchange.
Figure 2:
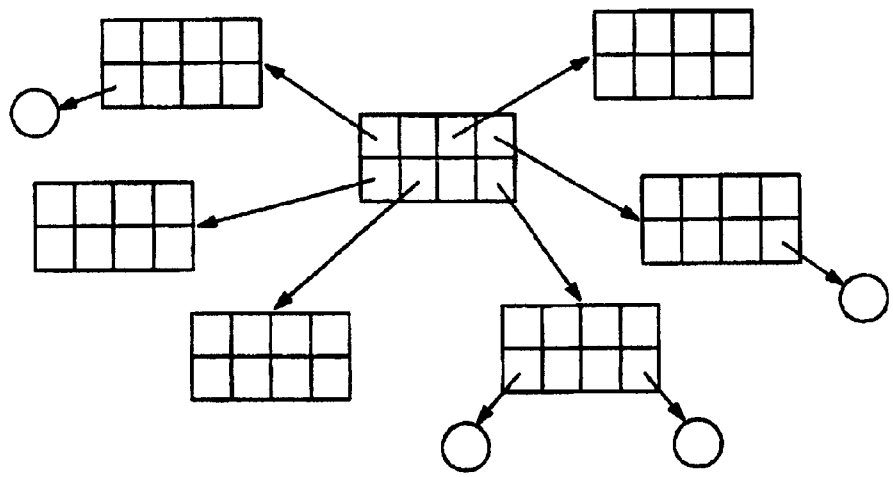
FIG. 2 shows a multidimensional trie structure.

As stated previously, in the present invention the trie structure has a multidimensional (generally n-dimensional) implementation. Such a multidimensional structure is otherwise fully similar to the unidimensional structure described at the beginning, but the element array contained in the trie node is multidimensional. FIG. 2 exemplifies a two-dimensional $2^2 * 2^1$ structure, in which one dimension in the element array comprises four elements and the other dimension two elements. Buckets pointed to from the elements in the trie node are indicated with circles in the figure.

Address computation in the multidimensional case is performed on the same principle as in the unidimensional case. The fundamental difference, however, resides in that instead of a single element array index, an index is calculated for each dimension in the element array (n indices). Each dimension thus has a search key space of its own $\{0, 1, \ldots, 2^{v_i}-1\}$ ($v_i$ is the length of the search key in bits in each dimension and $i \in \{1, \ldots n\}$).

The size of the trie node in the direction of each dimension is $2^{k_i}$ elements, and the total number of elements S in the trie node is also a power of two:

$$S = \Pi 2^{k_i} = 2^{k_1} \times 2^{k_2} \times 2^{k_3} \times \ldots = 2^N \qquad (1)$$

All elements in a trie node having n dimensions can thus be pointed to by n integers (n≧2), each of which may have a value in the range $\{0, 1 \ldots 2^{k_i}-1\}$. Thus the predetermined fixed parameter is the total length of the search key in each dimension. If for example one dimension of the search key has 256 attributes (such as first names) at most, the total length of the search key is 8 bits.

Figure 3:
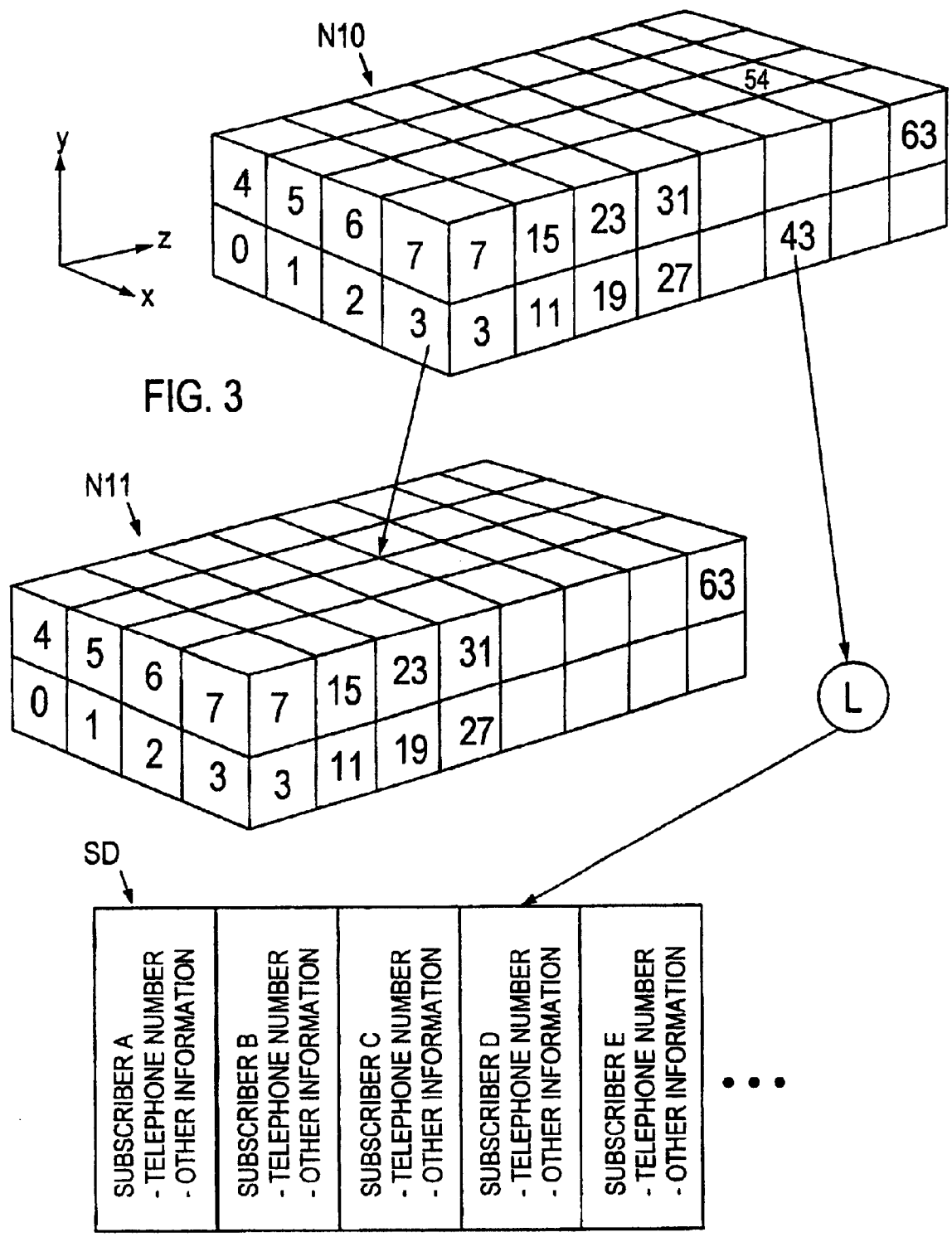
FIG. 3 shows a memory structure in accordance with the invention.

FIG. 3 shows an example of a node N10 used in the directory structure of the memory in accordance with the invention, employing a three-dimensional search key. In the direction of the first dimension (x), the trie node has $2^2=4$ elements, in the direction of the second dimension (y) $2^1=2$ elements, and in the direction of the third dimension (z) $2^3=8$ elements, which gives a total of $2^6=64$ elements in the trie node, numbered 0 . . . 63.

Since the memory space in practical hardware implementations (for example computer equipment) is unidimensional, the multidimensional array is linearized, i.e. converted to be unidirectional, in the address computation operation (that is, in proceeding in the directory tree). The linearization is an arithmetic operation that can be performed on arrays of all sizes. Hence, it is irrelevant whether the trie nodes or their element arrays are considered to be unidimensional or multidimensional, as multidimensional arrays are linearized in any case to be unidimensional.

In linearization, the elements in the array are numbered starting from zero (as shown in FIG. 3), the number of the last element being one less than the product of the sizes of all dimensions. The number of an element is the sum of the products of each coordinate (for example in the three-dimensional case, the x, y and z coordinates) and the sizes of the dimensions preceding it. The number thus computed is employed directly to index the unidimensional array.

In the case of the trie node shown in FIG. 3, the element number $VA_n$ is calculated in accordance with the above with the formula:

$$VA_n = x + y \times 4 + z \times 4 \times 2 \quad (2)$$

where $x \in \{0,1,2,3\}$, $y \in \{0,1\}$ and $z \in \{0,1,2,3,4,5,6,7\}$. Thus for example for element 54 we obtain from the coordinates thereof (2,1,6): $2+1\times4+6\times4\times2=2+4+48=54$.

When the (n-dimensioned) element array of a trie node of an n-dimensional trie structure is linearized, in accordance with the above the size of each dimension is $2^{k_i}$, where $k_i$ is the number of bits to be searched at a time in the dimension concerned. If a coordinate in accordance with the dimension is denoted by reference $a_j$ ($j \in \{0,1,2 \ldots n\}$), the linearization can be written out as $$\sum_{j=1}^{n} a_j \prod_{i=0}^{j-1} 2^{k_i}, \forall j: a_j \in \{0, 1, 2, \ldots, 2^{k_j} - 1\} \wedge k_0 = 0 \quad (3)$$

The linearization can be carried out by performing a multiplication in accordance with formula (3); yet it is expedient to perform the linearization by forming from the search key bits a bit string by known methods, the corresponding numeral indicating the element whose content provides the basis for proceeding in the directory tree. Such a linearization method is termed bit interleaving. Bit interleaving is a more efficient (rapid) method than the multiplication in accordance with formula (3), since when bit interleaving is used multiplications will be converted to additions and bit shifts, which are faster to perform.

The most common way to implement bit interleaving is the 'z ordering'. Another possible bit interleaving method is the line ordering. In the present invention, it is advantageous to use line ordering, as it affords the most efficient address computation in memory searches, but any known bit interleaving method may be employed, as long as the same method is employed in all nodes of the structure.

Figure 4:
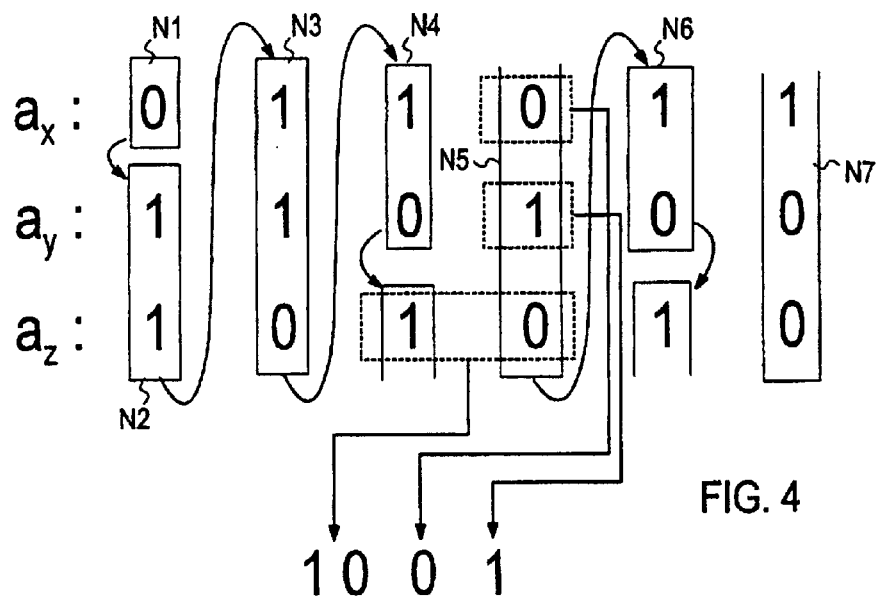
FIG. 4 illustrates implementation of address computation in the memory of the invention.

FIG. 4 illustrates an example of address computation performed in the trie structure in accordance with the invention. In the figure, it has still been presumed that the space is three-dimensional (dimensions x, y and z). It has further been presumed that search key $a_x$ in the direction of dimension x is $a_x=011011$, search key $a_y$ in the direction of dimension y is $a_y=110100$ and search key $a_z$ in the direction of dimension z is $a_z=101010$. The search keys are listed one below another in the figure.

In the nodes of the trie structure, the indexing bits of the unidimensional element array are shown in frames denoted by continuous lines. These frames illustrate how a global search key is divided into local search keys (element array indices), each being used in one node of the trie structure. All frames denoted by continuous lines relate to the first bit interleaving method, i.e. the z ordering. The nodes in the structure are denoted by references N1 . . . N7 in the order of progress. In the first node (N1) (at the uppermost level) only a single bit is employed, which is the leftmost bit in the search key of dimension x (which is a logical zero). Thereafter the routine proceeds in the direction of the arrow to the next node (N2), in which the number of bits forming the local search key is two. These are the leftmost bit in search key $a_y$ and the leftmost bit in search key $a_z$. In z ordering, the order of the bits is always as presently shown, in other words, the first bit of the first dimension is first extracted, thereafter the first bit of the second dimension, thereafter the first bit of the third dimension, etc. After the first bit of the last dimension, the second bits are extracted from the different dimensions, starting from the first dimension. In this way, the following node-specific element array indices are obtained: 0 (node N1), 11 (node N2), 110 (node N3), 10 (node N4), 1010 (node N5), 10 (node N6) and 1100 (node N7).

Alternatively, some other known bit interleaving method, such as line ordering, may be employed in the memory. In FIG. 4, the frames denoted by broken lines and the arrows pertaining to them illustrate the forming of an element array index in node N5, the memory employing bit interleaving with line ordering. In the example of the figure, it has further been presumed that progress has been made in nodes N1 . . . N4 so far that the first bit searched in node N5 is the third from the left in the search key in dimension z. In line ordering, all bits of each dimension are extracted at a time.

When line ordering is employed, the minimum number of bits to be extracted from the search keys of the different dimensions is first calculated in the node. This is obtained by dividing the number of bits searched in the node by the number of the dimensions and by truncating the obtained result to the closest integer. In this exemplary case, the number of bits to be searched in node N5 is four and the number of dimensions three, which gives a minimum number of one (that is, at least one bit must be extracted from the search key of each dimension). Thereafter it is still to be calculated how many additional bits must be extracted from the search keys of the different dimensions. The number of additional bits A is obtained from the formula A=k mod n, where k is the number of bits to be searched in the node and n is the number of dimensions. In this exemplary case, the result is A=4 mod 3=1. The result 1 thus means that one additional bit is to be extracted. Extraction of additional bits is always started from the first searched dimension. In this exemplary case, one additional bit is thus extracted from the search key of dimension z. If the result had been two, one additional bit from the search key of dimension z and one additional bit from the search key of dimension x would have been extracted.

Hence, in this exemplary case one bit from the search key of each dimension and additionally one bit from the search key of dimension z is extracted. Since in employing line ordering all bits of a dimension are extracted at a time, all bits (10) to be taken from dimension z are extracted first, thereafter all bits (0) to be taken from the search key of dimension x, and lastly all bits (1) to be extracted from the search key of dimension y. Thus, when line ordering is employed, the bit string 1001 is obtained as the element array index of node N5; this bit string is depicted in the lower portion of FIG. 4.

Since the address computation is performed by using bit interleaving known per se, the address computation will not be describer in further detail.

Figure 5:
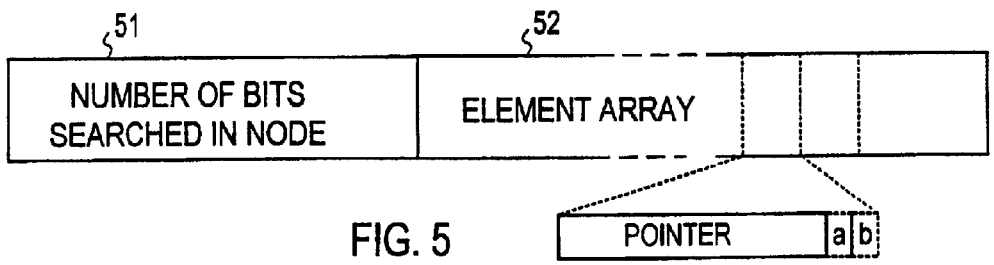
FIG. 5 illustrates the structure of a trie node of the memory.

Since the order of bits in the local search key (element array index) to be formed in each node is constant, only the number of bits to be used must be known in the bit string formation performed in each node. This data is stored in each node. In addition, only an element array must be present in each ordinary trie node. FIG. 5 illustrates the structure of an ordinary trie node. In its minimum configuration, the node thus comprises only two parts: a field indicating the number of bits to be searched in the node (reference 51) and an element array (reference 52), the number of elements in the array corresponding to a power of two. For proceeding in the directory tree, in addition to the number of bits to be searched the type of each node must be known. This data can be stored in the directory structure for example in each node or in the pointer of the parent of the node. By means of the two "extra" bits of the pointer (a and b, FIG. 5), information can be encoded in the pointer on whether a zero pointer (an empty element) is concerned or whether the pointer points to an ordinary trie node, a bucket or a compressed trie node (which will be described hereinbelow). The encoding may be for example of the type shown in the figure.

In the case of a bucketless structure, information on whether the pointer points to an uncompressed node, a compressed node or a data unit is stored.

The number of search key bits to be employed in each node will remain constant if there are no changes in the search keys. Insertions and deletions to be made in the database may nevertheless change the key distribution so that the number of bits to be searched in the node must be changed in order for the memory efficiency and storage space occupancy to remain as good as possible. With uniform key distributions, the number of bits to be searched in the node can be increased, and thus a smaller number of hash array indexings (the element array in the trie node serves as a hash array) than before is needed for an average retrieval. Hence, the effectiveness of memory searches is enhanced, since the depth of the tree-shaped structure is diminished as the node size increases. On the other hand, with non-uniform key distributions in connection with which storage space occupancy will present a problem in memory structures employing dynamic node size, the number of bits to be searched in the node can be maintained small to provide locally more uniform key distributions and thereby smaller storage space occupancy.

As stated previously, the problem with such a dynamically changing data structure will be how the memory structure is to be maintained to provide optimum efficiency and storage space occupancy. For this reason, specific logical conditions are set on the nodes in the structure; it is attempted to constantly maintain these conditions by changing the node sizes. These conditions will be described more closely in the following by still using as an example a structure employing buckets. The maintenance of the structure is similar if there are no buckets. In such a case, the equivalent of a bucket is a data unit (to which the leaf node in the bucketless structure points).

The first condition relates to the halving of the node. In accordance with this halving condition, the number of empty elements in the trie node must be smaller than or equal to half the number of elements in said node OR the number of elements pointing to trie nodes must be greater than a fourth of the number of elements in the node (the logical OR condition between the clauses has been indicated in upper case). If the situation changes as a result of deletions made in the database (underflow of node) so that the number of empty elements in the trie node is not smaller than or equal to half the number of elements in said node and neither is the number of elements pointing to trie nodes greater than a fourth of the number of elements in the node, the node size is reduced so that the condition is again satisfied. The reduction is carried out as halving of the node.

The above-described halving condition supports data storage in favor of deletions so that the storage space occupancy cannot increase as a result of deletions.

In order that the storing of data may be managed as efficiently as possible also in view of insertions, duplication of trie nodes is also carried out in the memory in accordance with a duplication condition. In accordance with the duplication condition, the number of pointers pointing from the trie node to other trie nodes must be smaller than or equal to half the number of elements in the node. If the situation changes as a result of an insertion made in the database so that this condition is no longer satisfied, the size of the node is duplicated.

Hence, in accordance with the invention halving and duplication of trie nodes is continually performed in the structure when the structure does not meet the above-stated conditions. For example for an array of 16 elements, these conditions mean that the number of empty elements may be eight at most. If this is not the case, the trie node must have more than four pointers to other trie nodes to avoid halving of the node. If, however, there are more than eight pointers to other trie nodes, the size of the node is duplicated. In the following, the maintenance of the structure will be described with reference to examples relating to bit interleaving with line ordering.

Figures 6A, 6B:
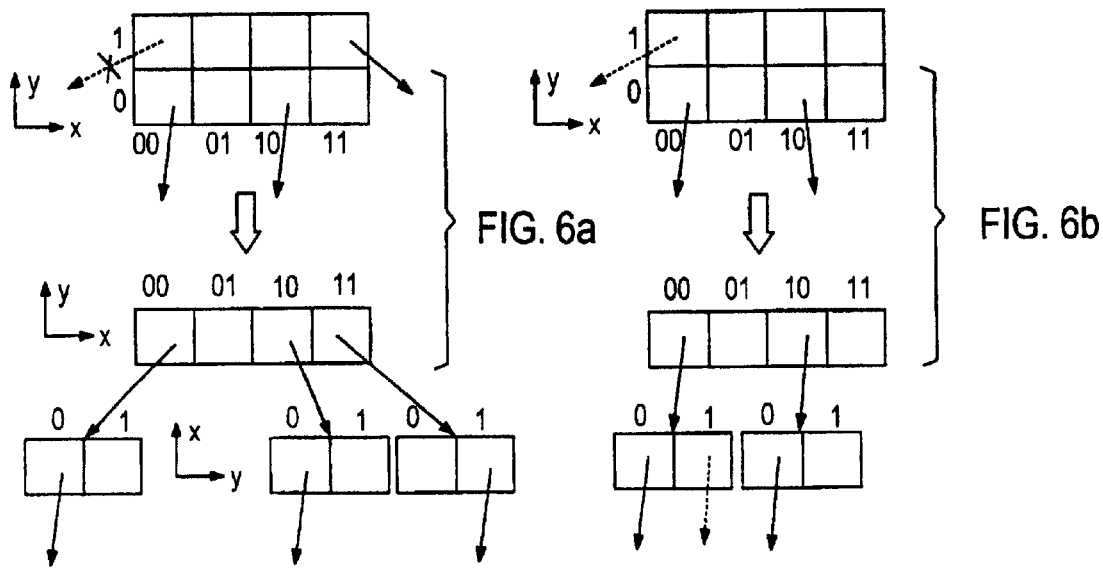
FIGS. 6a and 6b illustrate halving of a trie node, FIGS. 7a . . . 7c illustrate duplication of a trie node performed as a result of insertion, FIGS. 8a . . . 8c show another example of duplication of a trie node.

As stated previously, halving of the trie node is used to ensure that the storage space required by the structure will not increase under any conditions. FIG. 6a illustrates a situation in which an array of size eight contains three pointers to trie nodes (denoted by continuous arrows) and one pointer to a bucket (denoted by a broken arrow). If the bucket pointer is removed and the node is halved as a result, the situation is as shown at the bottom of FIG. 6a, in other words, the storage space required has increased by two elements. In accordance with the invention, however, halving is not performed in the situation of FIG. 6a yet, since the number of trie node pointers is greater than a fourth of the size of the node. Instead, halving is performed only in the situation shown at the top of FIG. 6b, in which the number of trie node pointers is no longer greater than a fourth of the node size. When halving is carried out, the situation shown at the bottom of FIG. 6b is reached, in which the required storage space is the same as prior to halving.

The uppermost node resulting from the halving always has the size of half the original node. Two-element nodes will always be created beneath this node, their number being a fourth of the size of the original node at most. The number of the nodes created at the lower level is dependent on how the pointers contained in the original node were distributed within the node. Halving will additionally produce one new level locally in the structure.

The maintenance of the duplicating condition of a trie node is illustrated in FIGS. 7a . . . 7c. It is presumed in the example of the figure that each bucket contains only one record or pointer to a record. FIG. 7a shows a (global or local) initial situation in which the structure comprises buckets L1 . . . L3. When one key/data unit (bucket L4) is added to the structure, the result is the situation of FIG. 7b. This situation is achieved because the directory structure must be added in depth (by known methods) until a trie node separating keys/data units into different buckets is produced. In such a situation, the number of trie node pointers in node N72 is equal to the number of elements in the node. In accordance with the above duplication rule, node N72 must therefore be duplicated. When duplication is carried out, a new node N75 of four elements is created, in which the pointers and buckets are placed in the manner shown in FIG. 7c. As is apparent from the figures, the storage space required by the new structure has been reduced by two elements from the storage space required by the original structure.

Duplication cannot be performed until the trie nodes pointed to from the trie node to be duplicated all have a size of two elements. Hence, before a trie node is duplicated all its child nodes must be made to have a size of two elements. Such a process has been illustrated in FIG. 8a . . . 8c. FIG. 8a shows an initial situation in which the uppermost node N80 of size two has two pointers to trie nodes, and thus the node is to be duplicated under the above rule. All child nodes of the node to be duplicated are first made two-element child nodes, and after the duplication the two-element child nodes are placed in the duplicated node in the correct manner. This will give first the intermediate state of FIG. 8b, in which the child nodes of the uppermost node have a size of two elements. After the duplication, the elements are placed in the duplicated node, thus giving the situation of FIG. 8c, in which the size of the uppermost node is duplicated.

FIGS. 9a and 9b illustrate the placing of elements in the duplication of a node, that is, the operation performed on the child of the node to be duplicated to make it a two-element node. In the above, this operation was performed on node N81 in FIG. 8a. The figure shows bits corresponding to each element in the direction of both dimensions (x and y) and additionally the decimal number corresponding to the bits is shown within the node. When node N91 shown in FIG. 9a is divided, the division is performed by halving the array with respect to the dimension that was last duplicated, which in this exemplary case is the x axis. Thus, the division is performed along the vertical line shown in FIG. 9a. In the trie structure created from the node array of FIG. 9a, the first bit to be searched is an x bit, and hence the new local root will be node N92 having the size of two elements (FIG. 9b). Since the next bit to be searched is a y bit, two nodes of 16 elements are obtained under node N92, in which the element numbers of the original array have been used to illustrate how the elements of the original array are placed in the new structure. Each element is located in the place indicated by the corresponding bit combination.

By means of the above-described duplication of trie nodes, the number of directory levels can be minimized so that the total memory space required in the structure will not increase.

The duplication condition is known as such from the article *Analyti & Pramanik: Fast Search in Main Memory Databases*, ACM SIGMOD Record, 21(2):215–224, 1992. However, the method disclosed in the above article is not order-preserving, as the address computation method employed in the memory in accordance with the present invention.

To further minimize storage space occupancy, it is advantageous in certain cases to form compressed nodes from the nodes halved and duplicated in the above manner. If an ordinary trie node has only one child, this means that only one path "downward" in the tree passes through said trie node. To optimize memory space occupancy, a trie node containing only a single pointer (path downward) should preferably be replaced with a compressed node in which the number of bits searched in said path and the computed array index value are disclosed. Since it is advantageous from the point of view of storage space occupancy to form compressed nodes from single-child trie nodes throughout the entire memory structure, compression also means that at least two child nodes are always maintained for ordinary (uncompressed) trie nodes in the memory structure, that is, an individual (ordinary) trie node has pointers to at least two different lower-level nodes (child nodes). A compressed node replaces one or more successive internal nodes, each of which has one child, and hence the above-stated one child cannot be a bucket (or a leaf in a structure that has no buckets). Hence, a child node must be an ordinary trie node in order for compression to be possible. From the point of view of optimizing storage space, it is thus advantageous to always maintain at least two child nodes for trie nodes preceding a bucket as well (i.e., if the bucket is preceded by a trie node having a size of two elements, said trie node always has two child nodes).

The memory in accordance with the invention thus comprises two types of trie nodes: ordinary trie nodes containing an element array in accordance with FIG. 5, and compressed nodes that will be described in the following.

FIGS. 10a and 10b illustrate the principle of forming a compressed node. FIG. 10a shows a trie structure comprising six nodes, having only one path for the five uppermost nodes. This trie structure of five nodes can be replaced with one element array shown in FIG. 10b. Since the structure has a single path for these nodes, only one element of the array is in use, which in this exemplary case is element 18 circled in the figure (18=01010 when the bits are taken in line order, i.e. the x bits first and thereafter the y bits). Thus, for the five uppermost nodes the trie structure can be replaced with a compressed node in which the number of bits to be searched (5) and the value of the array index (18) are stored.

FIGS. 11a and 11b show a local maintenance example when data units and associated keys are deleted from a database. FIG. 11a shows an initial situation in which the memory structure comprises trie nodes N111 . . . N113 and buckets L2 . . . L4. Thereafter bucket L2 and the pointer/record contained therein is deleted from the memory, as a result of which nodes N111 and N112 can be replaced with a compressed node CN, in which the index of the pointer contained in the node and the number of bits searched in the path replaced by the compressed node are disclosed. Hence, the compressed node is in principle similar to an ordinary trie node, but instead of the entire large-size element array with only one pointer being stored, the index of the pointer concerned and the number of bits searched in the path are stored. This creates the compressed node CN in accordance with FIG. 11b, in which the number of bits searched in said path (3) and the index corresponding to said pointer (101=5 when bit interleaving with line ordering is used) are disclosed. A compressed node thus has a virtual array replacing the information contained in the one or more node arrays existing in the path. If the compressed node replaces several ordinary trie nodes, the number of searched bits indicated in the compressed node is equal to the sum of the numbers of bits searched in the replaced nodes.

FIG. 12 illustrates the structure of a compressed node. The minimum configuration of the node comprises 3 parts: field 120 indicating the number of searched bits, field 121 storing the value of the array index, and field 122 storing a pointer to a child node. The compressed node is in need of this data in order for the search to proceed with the correct value at the compressed node as well, and in order for the restructuring of the node to be possible in connection with changes in the memory structure. (Without information on the number of searched bits, the array index value cannot be calculated from the search key, and on the other hand without the array index value the calculated value could not be compared to the value stored in the node.)

If a collision occurs in the compressed node in connection with an insertion, i.e. the compressed node will have a new pointer, it is studied which bit in order distinguishes the index of the initial pointer and the index of the new pointer. Accordingly, a structure replacing the initial compressed node is created, in which the new compressed node comprises the number of index bits insofar as there are common bits. In addition, one or more trie nodes are created in the structure at points corresponding to those bits in which the indices differ from one another.

If the compressed node is preceded by one or more compressed nodes or a chain of trie nodes providing only a single path, it is advantageous in view of storage space requirement and memory efficiency to further combine said nodes. Moreover, in view of memory efficiency it is advantageous to carry out the combination of nodes in such a way that only in the compressed node that is the last (lowest) in the chain the number of searched bits is smaller than the word length in the computer used. In other words, nodes are combined in such a way that the number of searched bits will be as large as possible in each compressed node. For example, three successive compressed nodes in which the numbers of searched bits are 5, 10 and 15 can be combined into one compressed node in which the number of searched bits is 30. Likewise, for example three successive compressed nodes (or three successive ordinary trie nodes that provide only one path) in which the numbers of searched bits are 10, 10 and 15 can be combined into two compressed nodes in which the numbers of searched bits are 32 and 3, with the word length employed being 32. Hence, it is attempted to obtain in as many compressed nodes as possible a number of searched bits corresponding to the word length of the computer, and the possible "superfluous" bits are left for the compressed node that is lowest in the hierarchy.

However, compressed nodes cannot be combined so as to make the number of bits searched in one node higher than the word length in the computer employed. Particularly in multidimensional cases (n>3), it is common that there are so many successive nodes containing one child that the path cannot be represented by a single compressed node. Therefore, the search path or part thereof is replaced with a chain made up by several successive compressed nodes, in which the number of searched bits is the same as the word bit number, for example 32 in the Intel architecture, except for the last node where the number of bits is smaller than or equal to the word bit number.

Such a situation is depicted in FIG. 13a, showing three successive compressed nodes CN1 . . . CN3. The numbers of bits searched in the nodes are denoted by references b, b' and b" and the values of the array indices contained in the nodes with i, i' and i", respectively. In the two uppermost nodes, the number of searched bits has a maximum value (providing that a 32-bit computer architecture is used).

It is advantageous to form from a chain of several successive compressed nodes resulting from limited word length a single node collecting such compressed nodes. This collecting node is formed in such a way that the pointer of the collecting node is set to point to the child of the compressed node that is last in said chain, the sum of the numbers of bits searched in the compressed nodes in the chain is set as the number of bits B searched in the collecting node, and the array indices (i.e. search words) produced by bit interleaving are inserted in the list or table T of the node in the order in which they appear in the successive compressed nodes. Thus, the collecting node will be a node CN4 as shown in FIG. 13b, comprising three parts: field 130 containing a pointer to said lower-level node, field 131 containing the number of searched bits B (the above sum), and list or table T containing in succession the array indices produced by bit interleaving. This third part thus has a varying size. In the example of the figure, the number of indices is three, since the example of FIG. 13a comprises three successive nodes.

The number of elements (i.e., indices) NE in table T is obtained from the number of searched bits B as follows:

$$NE = \begin{cases} B/W, & \text{if } B\,\text{MOD}\,W = 0 \\ \lfloor B/W \rfloor + 1, & \text{if } B\,\text{MOD}\,W \neq 0 \end{cases}$$

where $\lfloor \ \rfloor$ is a floor function truncating decimals from the number, W is the word length used, e.g. 32, and MOD refers to modulo arithmetic. Thus, the number of indices need not be stored in the collecting node as separate data, but it can be found on the basis of the number of searched bits.

The number of bits B' needed to calculate the last index in the table (denoted by reference b" in the figure), which does not necessarily equal the word length, is obtained as follows:

$$B' = \begin{cases} W, & \text{if } B\,\text{MOD}\,W = 0 \\ B\,\text{MOD}\,W, & \text{if } B\,\text{MOD}\,W \neq 0 \end{cases}$$

By forming a collecting node from several successive compressed nodes, the number of memory references (pointers) can be reduced further. In present-day computer architecture, comprising caches of various levels, memory references require considerable computation time, and hence the computation time will be diminished. At the same time, the need for storage space for pointers is eliminated.

By means of compressed nodes, the storage requirement can be effectively minimized particularly in conjunction with non-uniform key distributions, since by means of compression the depth of the structure can be arbitrarily increased on a local basis without increased storage space requirement.

It should further be noted that each of the above examples illustrates only the relevant operations in each case. For example, FIGS. 7a and 7b depicting duplication do not go into node compression yet (even though on the basis of the above the uppermost node in FIG. 7a would become a compressed node).

As was already indirectly stated above, in the memory in accordance with the invention a bucket cannot be preceded by a compressed node, but the parent node of a bucket is always either an ordinary trie node or an empty element. Hence, a compressed node cannot point to a bucket, but it always points either to another compressed node or to an ordinary trie node. An empty element means that if the total number of records is smaller that the number of pointers/records that the bucket can accommodate, a tree-shaped structure is not needed yet, but one bucket will suffice in the structure (in which case said node is conceptually preceded by an empty element). It is advantageous to proceed in this way at the initial phase of starting up the memory. It is thus worth-while starting building up the tree-shaped structure only when this is necessary.

The conditions described above can be maintained either continually throughout the entire structure (globally) or only locally in accordance with at which point of the structure insertions or deletions are currently made.

Disregarding the fact that insertions may trigger duplication of nodes or deletions may trigger halving and compression, the retrievals, insertions and deletions are performed in a manner known per se. In this respect, reference is made e.g. to the international application mentioned at the beginning, providing a more detailed description of collision situations in association with insertions, for example. Instead of conventional deletion updating, the memory may also employ functional updating implemented by known methods by copying the path from root to buckets.

FIG. 14 shows a memory in accordance with the invention on block diagram level. Each dimension has a dedicated input register, and hence there is a total of n input registers. The search key of each dimension is stored in these input registers, denoted by references $R_1 \ldots R_n$, each key in a register of its own. The input registers are connected to a register TR in which the above-described search word is formed in accordance with the bit interleaving method employed. The register tR is connected via adder S to the address input of memory MEM. The output of the memory in turn is connected to address register AR the output of which in turn is connected to adder S. Initially the bits selected from each register are read into the common register TR in the correct order. The initial address of the first trie node is first stored in the address register AR, and the address obtained as an offset address from register TR is added to the initial address in adder S. The resulting address is supplied to the address input of the memory MEM, and the data output of the memory provides the initial address of the next trie node, the address being written into the address register AR over the previous address stored therein. Thereafter the next selected bits are again loaded from the input registers into the common register TR in the correct order, and the array address thus obtained is added to the initial address of the relevant array (i.e., trie node), obtained from the address register AR. This address is again supplied to the address input of the memory MEM, the data output of the memory thereafter providing the initial address of the next node. The above-described procedure is repeated until the desired point has been accessed and recordal can be performed or the desired record read.

Control logic CL attends to maintenance of the memory structure and to the correct number of bits being extracted from the registers in each node.

The rapidity of the address computation can be influenced by the type of hardware configuration chosen. Since progress is by way of the above-stated bit manipulations, address computation can be accelerated by shifting from use of one processor to a multiprocessor environment in which parallel processing is carried out. An alternative implementation to the multiprocessor environment is an ASIC circuit.

Even though the invention has been described in the above with reference to examples in accordance with the accompanying drawings, it is obvious that the invention is not to be so restricted, but it can be modified within the scope of the inventive idea disclosed in the appended claims. The structure may also be implemented for keys of variable length. Also, the address computation may continue in the bucket, providing that unsearched bits remain. The definition of a bucket given at the beginning is thus to be broadened to read that a bucket is a data structure that may also contain another trie structure. Hence, several directory structures in accordance with the present invention can be linked in succession in such a way that another directory structure (that is, another trie structure) is stored in a bucket, or a pointer contained in a bucket or a leaf points to another directory structure. Reference from a bucket or a leaf is made directly to the root node of the next directory structure. Generally, it may be stated that a bucket contains at least one element so that the type of an individual element is selected from a group comprising a data unit, a pointer to a stored data unit, a pointer to another directory structure and another directory structure. The detailed implementation of buckets is dependent on the application. In many cases, all elements in buckets may be of the same type, being e.g. either a data unit or a pointer to a data unit. On the other hand, for instance in an application in which character strings are stored in the memory the bucket may contain element pairs in such a way that all pairs in the bucket are either pointer to data unit/pointer to directory structure pairs or data unit/pointer to a directory structure pairs or data unit/directory structure pairs. In such a case, for example, the prefix of the character string may be stored in the data unit and the search may be continued from the directory structure that is the pair of the data unit.

What is claimed is:

1. A method for implementing a memory, in which memory data is stored as data units for each of which a dedicated storage space is assigned in the memory, in accordance with which method the memory is implemented as a directory structure comprising a tree-shaped hierarchy having nodes at several different levels, wherein an individual node can be (i) a trie; node comprising an array wherein an individual element may contain the address of a lower node in the tree-shaped hierarchy and wherein an individual element may also be empty, the number of elements in the array corresponding to a power of two, or (ii) a bucket containing at least one element in such a way that the type of an individual element in the bucket is selected from a group including a data unit, a pointer to a stored data unit, a pointer to another directory structure and another directory structure, address computation performed in the directory structure comprises the steps of (a) selecting in the trie node at the uppermost level of the tree-shaped hierarchy a node-specific number of bits from the bit string formed by the search keys employed, forming from the selected bits a search word with which the address of the next node is sought in the node, and proceeding to said node, (b) selecting from the unselected bits in the bit string formed by the search keys employed a node-specific number of bits and forming from the selected bits a search word with which the address of a further new node at a lower level is sought from the array of the node that has been accessed, repeating step (b) until an empty element is encountered or until the address of the new node at a lower level is the address of a bucket, characterized in that trie nodes are maintained in the directory structure in such a way that (c) in a trie node, the number of empty elements is smaller than or equal to half the number of elements in said node or alternatively the number of elements pointing to other trie nodes is greater than a fourth of the number of elements in the node, and (d) the number of addresses in the trie node pointing to other trie nodes is smaller than or equal to half the number of elements in the node, wherein when condition (c) is false the node is halved and when condition (d) is false the node is duplicated.

2. A method as claimed in claim 1, characterized in that in at least part of the directory structure, sets of successive trie nodes are replaced with compressed nodes in such a That an individual set made up by successive trie nodes, from each of which there is only one address to a trie node at a lower level, is replaced with a compressed node (CN) storing an address to the node that the lowest node in the set to be replaced points to, information on the value of the search word by means of which said address is found, and information on the total number of bits from which search words are formed in the set to be replaced.

3. A method as claimed in claim 2, characterized in that replacement is carried out in the entire directory structure so that all said sets are replaced with compressed nodes.

4. A method as claimed in claim 2, characterized in that replacement is also carried out on a set having only one trie node, the total number of bits to be stored corresponding to the number of bits from which a search word is formed in said trie node.

5. A method as claimed in claim 2, characterized in that several successive compressed nodes are formed in the directory structure in such a way that at least in the compressed node at the uppermost level a number of search key bits to be searched corresponding to the word length employed is collected.

6. A method as claimed in claim 1, characterized in that several successive compressed nodes are combined into one new compressed node, the number of bits stored in the new node being the sum of the numbers obtained from the nodes to be combined.

7. A method as claimed in claim 5, characterized in that a chain made up by successive compressed nodes wherein the number of bits searched in at least two uppermost nodes corresponds to the word length employed is replaced with one collecting node (CN4) comprising
   an address to the node to which the lowest node in the chain contains an address,
   the sum of the numbers of searched bits obtained from the nodes in the chain, and
   the search word values contained in the chain nodes in sequence.

8. A method as claimed in claim 3, characterized in that in all uncompressed trie nodes of the memory, at least two addresses to a lower-level node are maintained.

9. A method as claimed in claim 2, characterized in that the directory structure stores for each node information on the fact whether an uncompressed trie node, a compressed trie node or a bucket is concerned.

10. A method for implementing a memory, in which memory data is stored as data units for each of which a dedicated storage space is assigned in the memory, in accordance with which method
   the memory is implemented as a directory structure composing a tree-shaped hierarchy having nodes at several different levels, wherein an individual node can be (i) an internal node comprising an array wherein an individual element may contain the address of a lower node in the tree-shaped hierarchy and wherein an individual element may also be empty, the number of elements in the array corresponding to a power of two, or (ii) a leaf containing at least one element the type of which is one from a group including a pointer to a stored data unit and a pointer to another directory structure,
   address computation performed in the directory structure comprises the steps of
      (a) selecting in the node at the uppermost level of the tree-shaped hierarchy a node-specific number of bits from the bit string formed by the search keys employed, forming from the selected bits a search word with which the address of the next node is sought in the node, and proceeding to said node,
      (b) selecting from the unselected bits in the bit string formed by the search keys employed a node-specific number of bits and forming from the selected bits a search word with which the address of a further new node at a lower level is sought from the array of the node that has been accessed,
      repeating step (b) until an empty element is encountered or until the address of the new node at a lower level is the address of a leaf,
   characterized in that
   internal nodes are maintained in the directory structure in such a way that
      (c) in an internal node, the number of empty elements is smaller than or equal to half the number of elements in said node or alternatively the number of elements pointing to other internal nodes is greater than a fourth of the number of elements in the node, and
      (d) the number of addresses in the internal node pointing to other internal nodes is smaller than or equal to half the number of elements in the node,
      wherein when condition (c) is false the node is halved and when condition (d) is false the node is duplicated.

11. A method as claimed in claim 10, characterized in that in at least part of the directory structure, sets of successive internal nodes are replaced with compressed nodes in such a way that an individual set made up by successive internal nodes, from each of which there is only one address to an internal node at a lower level, is replaced with a compressed node (CN) storing an address to the node that the lowest node in the set to be replaced points to, information on the value of the search word by means of which said address is found, and information on the total number of bits from which search words are formed in the set to be replaced.

12. A method as claimed in claim 11, characterized in that replacement is performed in the entire directory structure in such a way that all said sets are replaced with compressed nodes.

13. A method as claimed in claim 11, characterized in that replacement is also carried out on a set comprising only one internal node, the total number of bits to be stored corresponding to the number of bits from which a search word is formed in said internal node.

14. A method as claimed in claim 11, characterized in that several successive compressed nodes are fort in the directory structure in such a way that at least in the compressed node at the uppermost level a number of search key bits to be searched corresponding to the word length employed is collected.

15. A method as claimed in claim 10, characterized in that several successive compressed nodes are combined into one new compressed node, the number of bits stored in the new node being the sum of the numbers obtained from the combined nodes.

16. A method as claimed in claim 14, characterized in that a chain made up by successive compressed nags wherein the number of bits searched in at least two uppermost nodes corresponds to the word length employed is replaced with one collecting node (CN4) comprising
   an address to the node to which the lowest node in the chain contains an address,
   the sum of the numbers of searched bits obtained from the nodes in the chain, and
   the search word values contained in the chain nodes in sequence.

17. A method as claimed in claim 12, characterized in that in all uncompressed internal nodes of the memory, at least two addresses to a lower-level node are maintained.

18. A method as claimed in claim 11, characterized in that the memory stores information on the fact whether the address points to an uncompressed node, a compressed node or a data unit.

* * * * *